United States Patent
Funahashi et al.

(10) Patent No.: US 7,948,740 B2
(45) Date of Patent: May 24, 2011

(54) SOLID ELECTROLYTIC CAPACITOR AND METHOD OF MANUFACTURING THE SAME

(75) Inventors: Minoru Funahashi, Aomori (JP); Akira Ueda, Aomori (JP); Katsuharu Yamada, Aomori (JP)

(73) Assignee: Nichicon Corporation, Kyoto (JP)

( * ) Notice: Subject to any disclaimer, the term of this patent is extended or adjusted under 35 U.S.C. 154(b) by 495 days.

(21) Appl. No.: 12/051,519

(22) Filed: Mar. 19, 2008

(65) Prior Publication Data

US 2008/0232034 A1 Sep. 25, 2008

(30) Foreign Application Priority Data

Mar. 19, 2007 (JP) ................................. 2007-070289

(51) Int. Cl.
*H01G 9/00* (2006.01)

(52) U.S. Cl. ........ 361/523; 361/516; 361/519; 361/525; 361/528; 361/529

(58) Field of Classification Search .................. 361/523, 361/516–519, 525–529, 540–541; 29/25.01, 29/25.03

See application file for complete search history.

(56) References Cited

U.S. PATENT DOCUMENTS

| | | | | |
|---|---|---|---|---|
| 6,765,785 B2 * | 7/2004 | Honda et al. | ................... | 361/525 |
| 6,771,488 B2 * | 8/2004 | Takagi et al. | .................. | 361/523 |
| 6,839,222 B2 * | 1/2005 | Takaoka et al. | ............... | 361/512 |
| 6,853,537 B2 * | 2/2005 | Ishii | ............................... | 361/512 |
| 6,962,612 B1 * | 11/2005 | Saito et al. | .................... | 29/25.03 |

FOREIGN PATENT DOCUMENTS

| | | |
|---|---|---|
| CN | 1225495 A | 8/1999 |
| CN | 1702788 A | 11/2005 |
| JP | 09 213573 A | 8/1997 |
| JP | 11-204377 A | 7/1999 |
| JP | 2000-58389 A | 2/2000 |
| JP | 2001-284179 A | 10/2001 |
| JP | 2002-110466 A | 4/2002 |
| JP | 2004-193402 A | 7/2004 |

* cited by examiner

*Primary Examiner* — Nguyen T Ha
(74) *Attorney, Agent, or Firm* — Arent Fox LLP

(57) ABSTRACT

A method of manufacturing a solid electrolytic capacitor includes: rolling an anode foil, a cathode foil and a separator together, the separator being a mixed fiber composed of a chemical fiber and a natural fiber and being between the anode foil and the cathode foil; degrading and removing the natural fiber with enzyme; and forming an electrolytic layer composed of solid polymer between the anode foil and the cathode foil after degrading and removing the natural fiber.

8 Claims, 4 Drawing Sheets

OXIDIZER

ELECTROLYTIC SOLUTION

MONOMER SOLUTION

SOLID ELECTROLYTIC CAPACITOR AND METHOD OF MANUFACTURING THE SAME

BACKGROUND OF THE INVENTION

1. Field of the Invention

The present invention relates to a solid electrolytic capacitor and a method of manufacturing the solid electrolytic capacitor.

2. Description of the Related Art

Recently, a solder including no lead is being used in a reflow process in consideration of environmental problem. The solder has a melting point higher than that of a solder including lead. It is therefore necessary to increase temperature of the reflow compared to that of conventional reflow. This may result in increase of thermal stress applied to a solid electrolytic capacitor, swelling of the capacitor, and degradation of the capacitor.

Japanese Patent Application Publication No. 11-204377 (hereinafter referred to as Document 1) discloses an art where a polymerized element is protected by a thermoset resin, in order to restrain the swelling. Japanese Patent Application Publication No. 2000-58389 (hereinafter referred to as Document 2) discloses an art where an element is subjected to a thermal treatment of 200 degrees C. to 300 degrees C. before being housed in a case. Japanese Patent Application Publication No. 2001-284179 (hereinafter referred to as Document 3) discloses an art where an element in which a vinylon separator is included with a silver coated lead line is subjected to a thermal treatment of 175 degrees C. to 300 degrees C. before monomer oxidizer is impregnated into the element. Japanese Patent Application Publication No. 2002-110466 (hereinafter referred to as Document 4) discloses an art where ferric p-toluene sulfonate solution is impregnated into an element having a vinylon separator and the element is subjected to a thermal treatment of 150 degrees C. to 200 degrees C.

However, the polymerized element is subjected to a stress because of hardening of the thermoset resin in a case where the thermoset resin protects the polymerized element, with the art disclosed in Document 1. This results in increase of leaking current. An anode oxide coating is subjected to a thermal stress because of the treatment, with the art disclosed in Document 2. This results in increase of the leaking current. The silver coating is sulfurized into a silver sulfide because of sulfidizing gas generated during chemical polymerization of monomer and oxidizer, with the art disclosed in Document 3. This results in a barrier during soldering. And vinylon fiber used for the vinylon separator is not generally used. A separator made of only vinylon fiber is expensive and has a high density. It is difficult to provide an inexpensive capacitor having high ESR, with the art disclosed in Document 4.

And so, a thermal degradation may be used in order to restrain swelling caused by the reflow, because oxidizer degrades natural fiber after the polymerization of monomer. However, the anode oxide coating may be degraded because of thermal stress, and the leaking current may be increased.

A method using synthesized fiber separator may be used in order to restrain swelling caused by reflow heat. However, the synthesized fiber separator is not generally used and is expensive. It is therefore difficult to provide an inexpensive capacitor. And it is difficult to reduce the density of the synthesized separator compared to a natural fiber separator. Therefore, the ESR may be degraded, compared to a case where the natural fiber separator is used. When a rolled element is fabricated with a low density separator manufacturable with present technology, strength of the separator may not be sufficient. In this case, the separator may be broken during rolling.

SUMMARY OF THE INVENTION

The present invention has been made in view of the above circumstances, and provides a method of manufacturing a solid electrolytic capacitor in which breaking of a separator during rolling is restrained and swelling caused by a reflow heat is restrained. And the present invention provides a solid electrolytic capacitor in which swelling caused by reflow heat is restrained.

According to an aspect of the present invention, there is provided a method of manufacturing a solid electrolytic capacitor including: rolling an anode foil, a cathode foil and a separator together, the separator being a mixed fiber composed of a chemical fiber and a natural fiber and being between the anode foil and the cathode foil; degrading and removing the natural fiber with enzyme; and forming an electrolytic layer composed of solid polymer between the anode foil and the cathode foil after degrading and removing the natural fiber.

With the method, the separator has a given strength, because the separator includes the natural fiber during the rolling of the anode foil and the cathode foil. Therefore, breaking of the separator may be restrained during the rolling. Density of the separator is reduced after the natural fiber is removed from the separator. Filling density of the electrolytic layer is increased between the anode foil and the cathode foil. And the electrolytic layer is stabilized. Consequently, ESR of the solid electrolytic capacitor may be reduced. And a reaction between oxidizer and the natural fiber may be restrained during a heating process. Therefore, swelling may be restrained.

According to another aspect of the present invention, there is provided a solid electrolytic capacitor including an anode foil, a cathode foil, a separator; and an electrolytic layer. The anode foil, the cathode foil and the separator are rolled together. The separator is between the anode foil and the cathode foil. The electrolytic layer is between the anode foil and the cathode foil. The separator is composed of chemical fiber. And a density of the chemical fiber is less than 0.2 g/cm$^3$.

With the structure, filling density of the electrolytic layer is increased because density of the separator is reduced. Therefore, ESR of the solid electrolytic capacitor may be improved.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
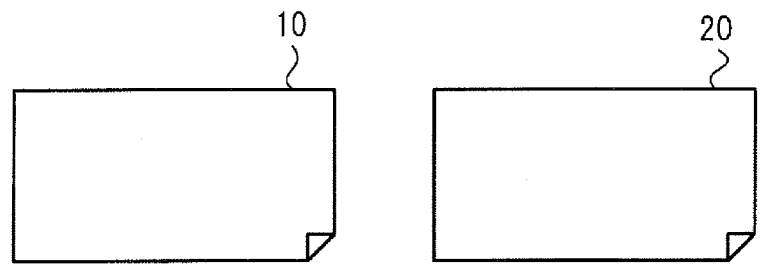
FIG. 1A through FIG. 1D illustrate a method of manufacturing a solid electrolytic capacitor in accordance with a first embodiment.

FIG. 1A through 3B illustrate a method of manufacturing a solid electrolytic capacitor in accordance with a first embodiment. As shown in FIG. 1A, an anode foil 10 and a cathode foil 20 are provided. The anode foil 10 is made of a valve metal having a dielectric oxide coating (not illustrated) formed on a surface thereof. The valve metal used for the anode foil 10 is a metal such as aluminum. The dielectric coating may be formed when a surface of the valve metal is subjected to an etching treatment and a chemical oxidizing treatment. The cathode foil 20 is made of a metal foil such as aluminum holding carbide grain (not illustrated) on a surface thereof. The anode foil 10 and the cathode foil 20 are substantially isometric to each other.

Figure 1B:
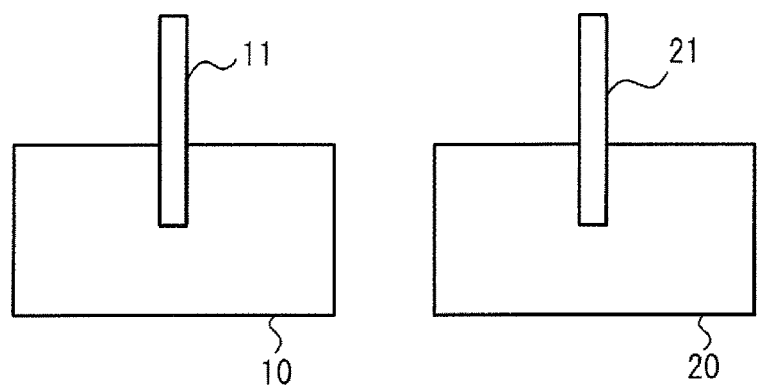
Figure 1C:
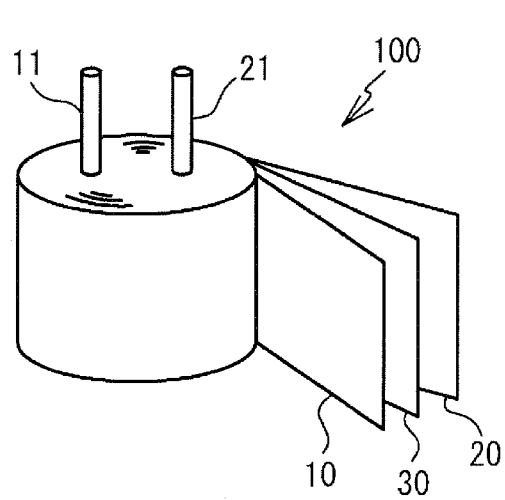

Next, as shown in FIG. 1B, an anode terminal 11 is jointed to the anode foil 10. A cathode terminal 21 is jointed to the cathode foil 20. Then, as shown in FIG. 1C, the anode foil 10, the cathode foil 20 and a separator 30 are rolled together, the separator being between the anode foil 10 and the cathode foil 20. This results in a rolled element 100. The separator 30 is composed of a mixed fiber in which chemical fiber and natural fiber are mixed. The chemical fiber used as the separator 30 is not limited. It is, however, preferable that the chemical fiber has a relatively small fiber diameter and a shape of the chemical fiber is maintained even if the chemical fiber is subjected to a high temperature of approximately 250 degrees C. It is therefore preferable that the chemical fiber is a synthetic fiber such as polyamide, acrylic, vinylon, polyester, polyimide, aramid, or nylon.

The natural fiber used as the separator 30 is not limited. It is, however, preferable that the natural fiber is swellable. It is therefore preferable that the natural fiber is plant fiber such as manila fiber, kraft pulp, hemp fiber, or cotton. These natural fibers are composed of fiber subjected to a refining treatment.

Figure 1D:
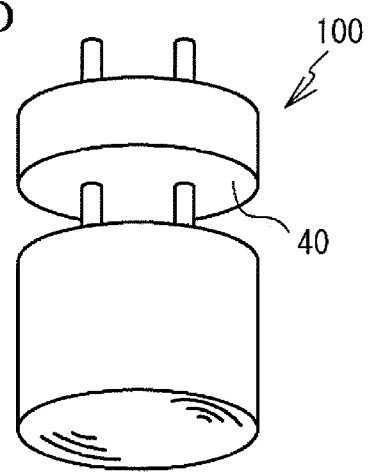
Figure 2A:
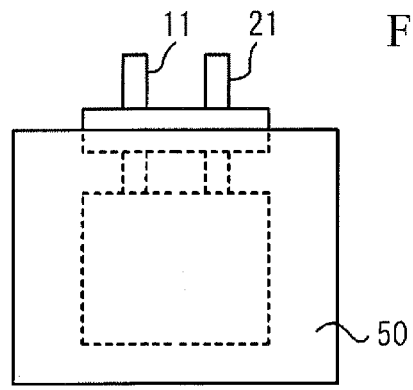
FIG. 2A through FIG. 2E illustrate the method of manufacturing the solid electrolytic capacitor in accordance with the first embodiment.

Then, as shown in FIG. 1D, the anode terminal 11 and the cathode terminal 21 are inserted into a through hole of a sealing member 40. The sealing member 40 is made of an elastic material such as rubber. Next, as shown in FIG. 2A, the anode foil 10, the cathode foil 20 and the separator 30 are immersed in enzyme solution 50 that includes enzyme degrading natural fiber. Thus, the natural fiber is selectively degraded from the separator 30. The above-mentioned enzyme is an enzyme degrading natural fiber selectively. The enzyme is such as cellulose-degrading enzyme like cellulase, or hemicellulose-degrading enzyme.

The enzyme solution 50 may be a solution in which the enzyme is solved into pure water. It is preferable that enzyme concentration of the enzyme solution 50, temperature of the enzyme solution 50 and time for which the separator 30 is immersed in the enzyme solution 50 are adequately set, in order to degrade the natural fiber of the separator 30 effectively. It is, for example, preferable that the enzyme concentration of the enzyme solution 50 is 0.1 weight % to 50 weight %. The temperature of the enzyme solution 50 is preferably 5 degrees C. to 70 degrees C., and is more preferably 20 degrees C. to 60 degrees C. And it is preferable that the time for which the separator 30 is immersed in the enzyme solution 50 is more than one hour. The degraded natural fiber may be removed with an ultra sonic cleaning treatment with pure water or the like. The method of removing the natural fiber is not limited.

Figure 2D:
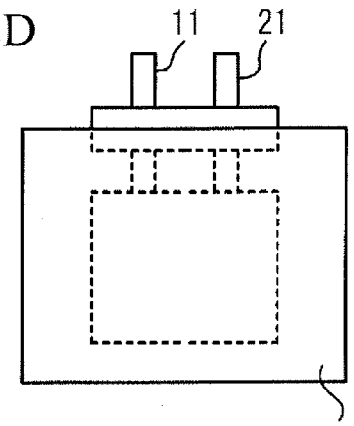
Figure 2B:
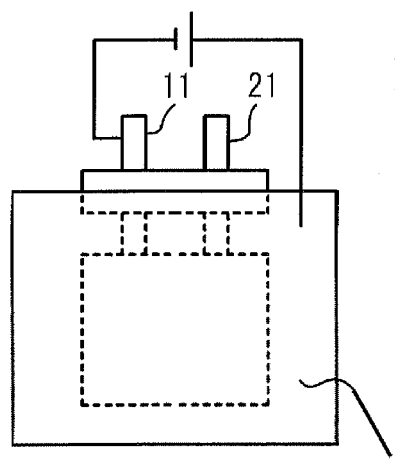

Next, as shown in FIG. 2B, the anode foil 10 is electrically energized in electrolytic solution and is subjected to a chemical conversion treatment. Solute used as the electrolytic solution may be organic acid salt having carboxylic acid function, inorganic acid salt such as phosphoric acid, or the like. In the embodiment, the electrolytic solution is adipic acid ammonium. This chemical conversion treatment uses chemical conversion solution having an adipic acid ammonium concentration of 0.5 weight % to 2 weight %, and is performed with voltage near a formation voltage of the dielectric oxide coating. After that, a thermal treatment is performed. And the chemical conversion treatment is repeated several times. Thus, secure dielectric oxide coating is formed. The thermal treatment is performed for a few minutes to a few tens minutes in a temperature range of 200 degrees C. to 320 degrees C. This chemical conversion treatment forms an oxide coating on the valve metal exposed on an end face (edge portion) of the anode foil 10 and on a metal face damaged and exposed during the connection of the terminal.

Figure 2E:
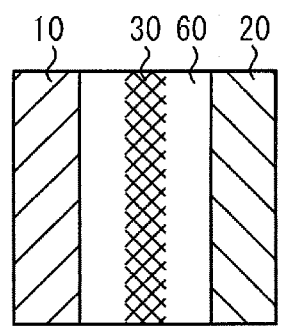
Figure 2C:
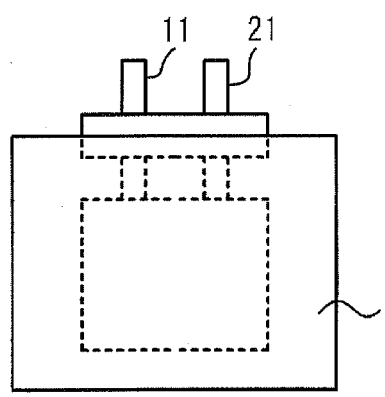

Then, as shown in FIG. 2C, the separator 30 is immersed in monomer solution in which polymerizable monomer is diluted with diluent solvent. And the monomer solution is heated. The polymerizable monomer may be 3,4-ethylenedioxythiophene or the like. The diluent solvent may be volatile solvent. Concentration of the polymerizable monomer is preferably 5 weight % to 50 weight %, and is more preferably 15 weight % to 30 weight %. The method of impregnation of the monomer solution may be a decompression impregnation, a vacuum-compression impregnation or the like other than the immersion impregnation shown in FIG. 2C. After that, the volatile solvent is dried and removed by heating the monomer solution.

The volatile solvent may be an organic solvent having more than one carbon number, and may be carbon hydride such as pentane, ether such as tetrahydrofuran, ester such as ethyl formate, ketone such as acetone, alcohol such as methanol, nitrogen compound such as acetonitrile, mixed solution of these, or the like. In particular, methanol, ethanol, acetone or the like are preferable.

It is preferable that the time for which the monomer solution is impregnated into the separator 30 in the process shown in FIG. 2C is optimized. This is because the monomer solution may not be sufficiently impregnated into the separator 30 when the impregnation time is short, and more than a given amount of the monomer may not be impregnated into the separator 30 even if the impregnation time is long. In the embodiment, it is preferable that the time for which the monomer solution is impregnated into the separator 30 is 30 seconds to 2 minutes. It is preferable that the temperature of the monomer solution is optimized. This is because enlargement of vaporizing time is needed when the temperature of the monomer solution is low, and the monomer may be vaporized when the time for which the monomer solution is impregnated into the separator 30 is long. In the embodiment, it is preferable that the temperature of the monomer solution is 20 degrees C. to 60 degrees C.

Then, as shown in FIG. 2D, an oxidizer is impregnated into the separator 30, in this case, the oxidizer may be impregnated into the separator 30 effectively, because a void is formed at a position where the volatile solvent is vaporized. The oxidizer may be ferric p-toluene sulfonate, ferric dodecylbenzenesulfonate, ferric methoxybenzenesulfonate or the like. Solvent of the oxidizer may be proton solvent such as alcohol solvent like butanol or ethanol, or may be non-proton solvent. The method of the impregnation of the oxidizer may be a decompression impregnation, a vacuum-compression impregnation, an atmosphere pressure immersion impregnation method.

The polymerizable polymer is polymerized and an electrolytic layer 60 composed of solid polymer is formed when the oxidizer is impregnated into the separator 30. Thus, a capacitor element 200 is fabricated. FIG. 2E illustrates a cross sectional view of the anode foil 10, the cathode foil 20, the separator 30 and the electrolytic layer 60.

The electrolytic layer 60 is composed of polyethylenedioxythiophene if the polymerizable monomer is 3,4-ethylenedioxythiophene. In this case, the polymerization is promoted if the polymerizable monomer is heated. It is, however, preferable that the polymerizable monomer is heated not rapidly but gradually. This is because the electrolytic layer 60 may be formed evenly.

Figure 3A:
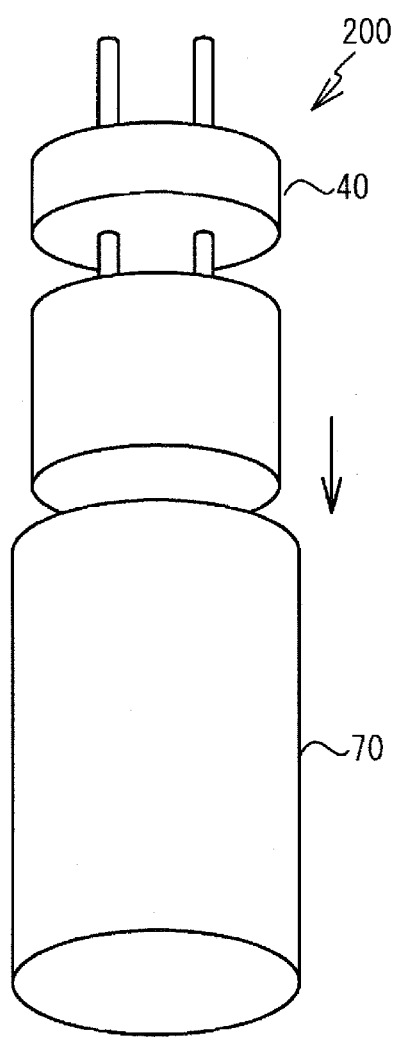
FIG. 3A and FIG. 3B illustrate the method of manufacturing the solid electrolytic capacitor in accordance with the first embodiment.
Figure 3B:
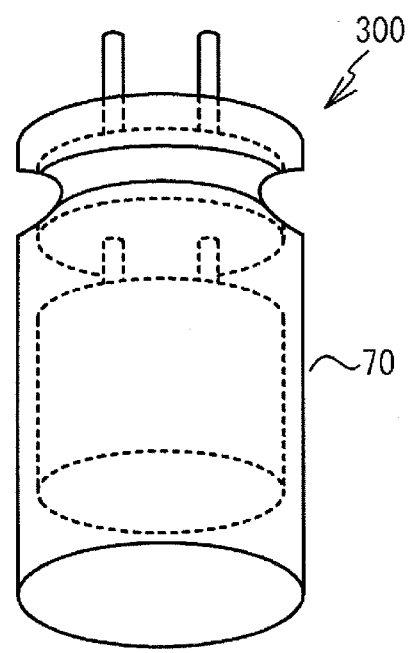

Next, as shown in FIG. 3A, the capacitor element 200 is housed in a metal case 70. Then, the sealing member 40 is pushed into an opening of the metal case 70. After that, the capacitor element 200 is subjected to an aging treatment in which normal-rated voltage is applied to the capacitor element 200 at approximately 150 degrees C. Defective portion of the anode foil 10 and defective portion of the cathode foil 20 are insulated from each other. A solid electrolytic capacitor 300 is fabricated. It is preferable that the temperature in the aging treatment is 105 degrees C. to 180 degrees C. This is because effect of the aging treatment may not be obtained at temperature less than 105 degrees C., and ESR characteristics may be degraded at temperature more than 180 degrees C.

Figure 4A:
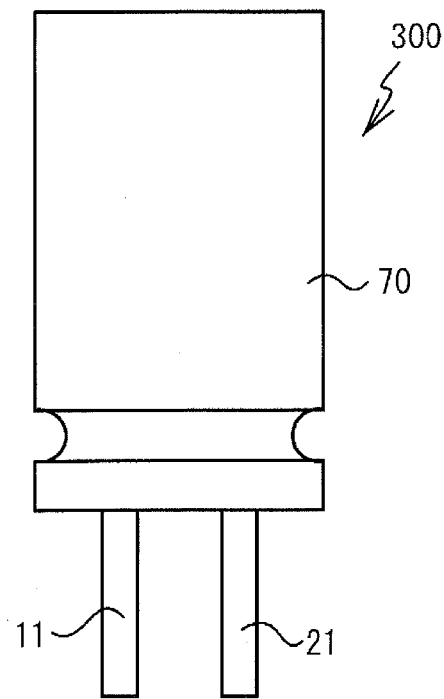
FIG. 4A and FIG. 4B illustrate the solid electrolytic capacitor in accordance with the first embodiment.
Figure 4B:
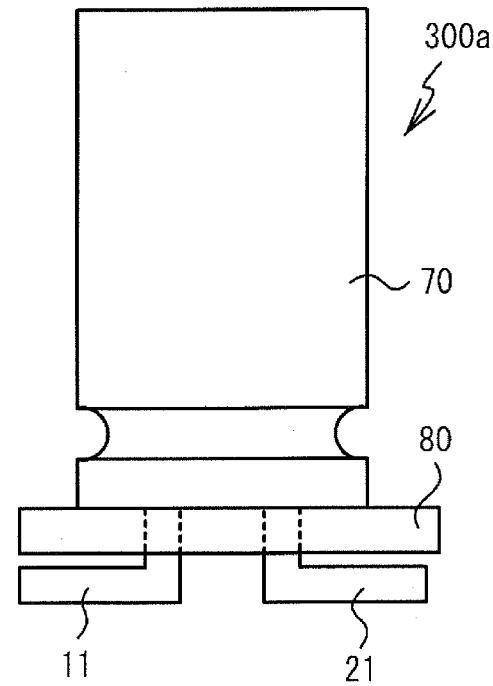

FIG. 4A illustrates an external view of the solid electrolytic capacitor 300 subjected to the aging treatment. A surface mountable solid electrolytic capacitor 300a illustrated in FIG. 4B is fabricated with following processes of adhering a board 80 to the sealing member 40 side of the solid electrolytic capacitor 300, penetrating the anode terminal 11 and the cathode terminal 21 through the board 80, and bending the anode terminal 11 and the cathode terminal 21 at a bottom of the through hole of the board 80 by 90 degrees.

In the embodiment, the separator 30 has a given strength because the separator 30 includes the natural fiber during the rolling of the anode foil 10 and the cathode foil 20. It is therefore possible to restrain breaking of the separator 30.

The density of the separator 30 is reduced when the natural fiber is removed from the separator 30. And, filling density of the electrolytic layer 60 is increased between the anode foil 10 and the cathode foil 20, and the electrolytic layer 60 is stabilized. The ESR of the solid electrolytic capacitors 300 and 300a is therefore reduced. It is preferable that the separator 30 is mainly made of the natural fiber, because the filling density of the electrolytic layer 60 is sufficiently increased. Here, "mainly made of the natural fiber" means that a weight ratio of the natural fiber against the chemical fiber is more than 1.

Here, swelling may be occurred, when the natural fiber reacts with the oxidizer in a heating process such ash reflow. It is, however, possible to restrain the swelling in the heating process because the natural fiber is removed in the embodiment.

The density of the separator 30 of which natural fiber is removed is preferably less than 0.2 g/cm$^3$, and is more preferably less than 0.15 g/cm$^3$. This is because the filling density of the electrolytic layer 60 is sufficiently large. The density of the separator 30 of which natural fiber is removed may be 0.2 g/cm$^3$ when a weight ratio of the chemical fiber and the natural fiber is 3:2, in a case where hemp fiber is used as the natural fiber and polyamide-based resin is used as the chemical fiber. The density of the separator 30 of which natural fiber is removed may be 0.15 g/cm$^3$ when a weight ratio of the chemical fiber and the natural fiber is 1:1. A lower limit of the density of the separator 30 of which natural fiber is removed is not limited if the anode foil 10 and the cathode foil 20 is not electrically conducted.

The chemical conversion treatment may be performed before degrading and removing the natural fiber, although the chemical conversion treatment is performed after degrading and removing the natural fiber, in the embodiment. However, in a case where the natural fiber is rested, the rested fiber may be removed, if the chemical conversion treatment is performed after degrading and removing the natural fiber. In this case, the ESR characteristics may be improved more. It is therefore preferable that the chemical conversion treatment is performed after degrading and removing the natural fiber.

The oxidizer is impregnated into the separator 30 after the monomer is impregnated into the separator 30, in the embodiment. However, the monomer may be impregnated into the separator 30 after the oxidizer is impregnated into the separator 30. A mixed liquid in which the monomer and the oxidizer are mixed may be impregnated into the separator 30.

EXAMPLES

The solid electrolytic capacitor 300 and the solid electrolytic capacitor 300a were fabricated.

First Example

The solid electrolytic capacitor 300 shown in FIG. 4A was fabricated in a first example. The anode foil 10 was formed of an aluminum foil that was subjected to an etching treatment and a chemical conversion treatment and had a width of 2.7 mm. The cathode foil 20 was formed of an aluminum that had a width of 2.7 mm and held the carbon grains on the surface of the cathode foil 20. The anode foil 10, the cathode foil 20 and the separator 30 were rolled together, the separator 30 being between the anode foil 10 and the cathode foil 20.

The separator 30 is a mixed fiber in which hemp fiber and polyamide resin are mixed in a weight ratio of 1:1. Cellulose-degrading enzyme made by Amano Enzyme Inc. was used as the enzyme for degrading the natural fiber. The enzyme was solved in pure water. And water solution having 1.0 weight % was formed. The rolled element 100 had been immersed in the water solution for 12 hours in a temperature-controlled bath having temperature of 50 degrees C. After that, the degraded fiber was removed with an ultra sonic cleaning method using pure water. The density of the separator 30 of which natural fiber is removed was 0.15 g/cm$^3$.

After that, the rolled element 100 was immersed in a chemical conversion liquid. A voltage near the formation voltage of the dielectric coating of the anode foil 10 was applied to the anode foil 10 for 10 minutes. The chemical conversion liquid included 2 weight % of adipidic acid ammonium salt. After that, the chemical conversion liquid was removed from the rolled element 100 in the pure water. The rolled element 100 was subjected to a thermal treatment of 200 degrees C. to 270 degrees C. for 10 minutes.

After that, the rolled element 100 was immersed in a monomer solution for one minute in which monomer concentration solution of 3,4-ethylenedioxythiophene is diluted with diluent solution made of ethanol. The concentration of the monomer in the monomer solution was 25 weight %. Next, the ethanol was dried and removed at temperature of 50 degrees C. Then, butanol solution including 55 weight % of ferric p-toluene sulfonate was impregnated into the rolled element 100. And the rolled element 100 was heated from 30 degrees C. to 180 degrees C. in stages. Thus, the electrolytic layer 60 composed of polyethylenedioxythiophene was made between the anode foil 10 and the cathode foil 20.

After that, the rolled element 100 was housed in the metal case 70 made of aluminum. The opening of the metal case 70 was sealed with the sealing member 40 made of rubber. The rolled element 100 was subjected to the aging treatment at temperature of 150 degrees C. in which the normal-rated voltage was applied to the rolled element 100. The capacitance of the solid electrolytic capacitor 300 in accordance with the first example was 2.5V560 µF, had a diameter of 6.3 mm, and had a length of 5.7 mm.

Second Example

In a second example, the board 80 was adhered to the sealing member 40 side of the solid electrolytic capacitor 300 fabricated in the first example. The anode terminal 11 and the cathode terminal 21 were penetrated through the board 80. The anode terminal 11 and the cathode terminal 21 were bended at the bottom of the through hole of the board 80 by 90 degrees. A part of the anode terminal 11 and a part of the cathode terminal 21 getting out of the board 80 were cut off. Thus, the solid electrolytic capacitor 300a shown in FIG. 4B in accordance with the second embodiment was fabricated.

First Comparative Example

Another solid electrolytic capacitor that is same as that in accordance with the first example was fabricated in a comparative example. However, the degradation and the removal of the natural fiber using the enzyme were omitted.

Second Comparative Example

Another solid electrolytic capacitor that is same as that in accordance with the second example was fabricated in a second comparative example. However, the degradation and the removal of the natural fiber using the enzyme were omitted.
(First Analysis)

The solid electrolytic capacitors of the first example, the second example, the first comparative example and the second comparative example were measured with respect to initial electrical characteristics. Table 1 shows respective values. Thirty solid electrolytic capacitors in accordance with the first example, the second example, the first comparative example and the second comparative example were respectively fabricated, and each value in Table 1 shows average value thereof.

TABLE 1

| | Electrical capacitance (µF) | tanδ | ESR (mΩ) | Leakage current (µA) |
|---|---|---|---|---|
| First Example | 562.0 | 0.018 | 8.6 | 78 |
| Second Example | 565.4 | 0.018 | 8.8 | 86 |
| First Comparative Example | 550.5 | 0.022 | 10.5 | 130 |
| Second Comparative Example | 551.3 | 0.023 | 10.7 | 142 |

As shown in Table 1, the ESR of the solid electrolytic capacitors in accordance with the first example and the second example were lower than those of the solid electrolytic capacitors in accordance with the first comparative example and the second comparative example. It is thought this is because the filling density of the electrolytic layer 60 was increased because of reduction of the density of the separator 30.
(Second Analysis)

Next, the solid electrolytic capacitor in accordance with the second example and the second comparative example were measured with respect to electrical characteristics after the reflow and an external view thereof. Hot air reflow was performed. In the hot air reflow, the temperature was kept 180 degrees C. to 200 degrees C. for 120 seconds and was kept more than 200 degrees C. for 120 seconds. The maximum temperature was 260 degrees C. The solid electrolytic capacitors were subjected to the hot air reflow twice. Table 2 shows respective value. Table 2 shows average value of thirty solid electrolytic capacitors in accordance with each of the examples. Table 3 shows existence and nonexistence of abnormality of external view. Table 3 shows the number of the samples having abnormality with fractional number.

TABLE 2

| | Electrical capacitance (µF) | tanδ | ESR (mΩ) | Leakage current (µA) |
|---|---|---|---|---|
| Second Example | 562.4 | 0.019 | 9.0 | 113 |
| Second Comparative Example | 546.6 | 0.028 | 12.5 | 196 |

TABLE 3

| | Swelling of Case or Rubber |
|---|---|
| Second Example | 0/30 |
| Second Comparative Example | 28/30 |

As shown in Table 2, the ESR of the solid electrolytic capacitor in accordance with the second comparative example was increased after the reflow. In contrast, the ESR of the solid electrolytic capacitor in accordance with the second example was increased little after the reflow. Abnormality of external view caused by swelling was observed after the reflow on the solid electrolytic capacitor in accordance with the second comparative example. In contrast, no abnormality of external view was observed after the reflow on the solid electrolytic capacitor in accordance with the second example.

It is thought that the ESR was improved and the swelling caused by heating was restrained because the natural fiber was degraded and removed.

While the above description constitutes the preferred embodiments of the present invention, it will be appreciated that the invention is susceptible of modification, variation and change without departing from the proper scope and fair meaning of the accompanying claims.

The present application is based on Japanese Patent Application No. 2007-070289 filed Mar. 19, 2007, the entire disclosure of which is hereby incorporated by reference.

What is claimed is:

1. A method of manufacturing a solid electrolytic capacitor, comprising:
   rolling an anode foil, a cathode foil and a separator together,
   the separator being a mixed fiber composed of a chemical fiber and a natural fiber and being between the anode foil and the cathode foil;
   degrading and removing the natural fiber with enzyme; and
   forming an electrolytic layer composed of solid polymer between the anode foil and the cathode foil after degrading and removing the natural fiber.

2. The method as claimed in claim 1, further comprising performing a chemical conversion treatment to the anode foil, wherein the step of degrading and removing the natural fiber is before the chemical conversion treatment.

3. The method as claimed in claim 1, wherein the mixed fiber is mainly composed of the natural fiber.

4. The method as claimed in claim 1, wherein the natural fiber is composed of fiber subjected to a refining treatment.

5. The method as claimed in claim 1, wherein the natural fiber is plant fiber.

6. The method as claimed in claim 1, wherein the chemical fiber is synthetic fiber.

7. The method as claimed in claim 1, wherein the enzyme includes at least one enzyme selected from cellulose-degrading enzymes and hemicellulose-degrading enzymes.

8. A solid electrolyte capacitor comprising:
an anode foil;
a cathode foil;
a separator; and
an electrolytic layer,
the anode foil, the cathode foil and the separator being rolled together,
the separator being between the anode foil and the cathode foil,
the electrolytic layer being between the anode foil and the cathode foil,
the separator being composed of chemical synthetic fiber, and a density of the synthetic fiber being less than $0.2$ $g/cm^3$.

* * * * *